Patented July 25, 1933

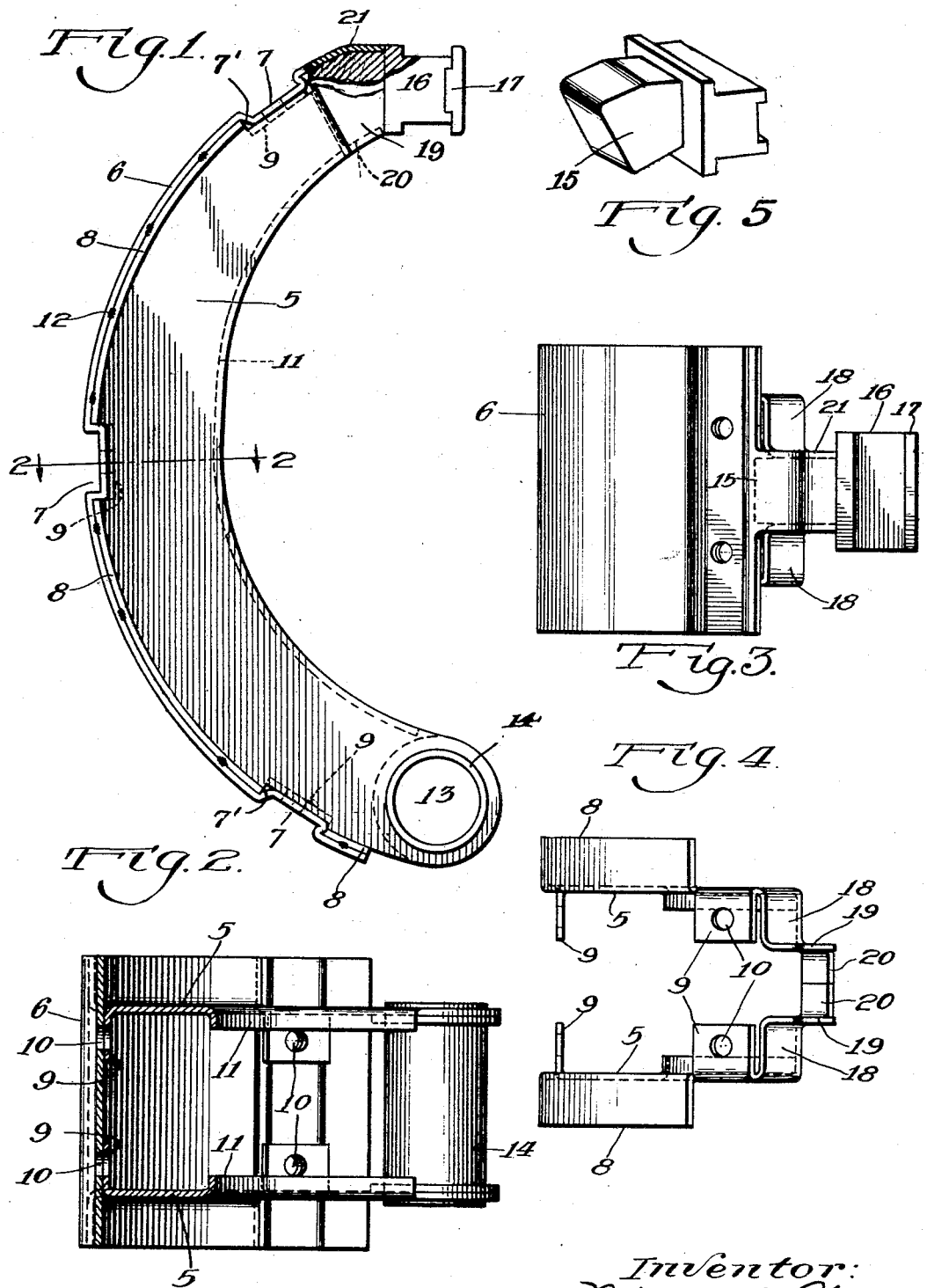

1,919,974

UNITED STATES PATENT OFFICE

WILLIAM A. BLUME, OF DETROIT, MICHIGAN, ASSIGNOR TO AMERICAN BRAKEBLOK CORPORATION, OF NEW YORK, N. Y., A CORPORATION OF NEW YORK

FRICTION BRAKE

Application filed March 12, 1931. Serial No. 521,932.

This invention relates to friction brakes and more particularly to the support for the friction element in an internal friction brake assembly.

The object of the invention is to make a strong and substantial, light and rigid supporting shoe out of sheet metal stampings securely fastened together.

Another object of the invention is to shape parts on the ends of the face plate and webs of the shoe to form a substantial socket for receiving and holding the shank of the seat for the wear plate on the shoe.

In the accompanying drawing illustrating a selected embodiment of the invention

Fig. 1 is a side elevation of a shoe designed for supporting friction blocks.

Fig. 2 is a sectional view on the line 2—2 of Fig. 1.

Fig. 3 is a top view of the shoe as shown in Fig. 1.

Fig. 4 is a top view of the webs of the shoe shown in their proper relation detached from the other parts.

Fig. 5 is a detail perspective view of the shoe seat and wear plate.

Referring to the drawing the invention comprises two webs 5 arranged in parallel relation and supporting a face plate 6. The webs and the face plate are arcuate in form or are otherwise made to support a friction element or elements (not shown) in proper position in the assembly of which the shoe forms a part. The face plate is indented or bent inwardly or otherwise shaped to form recesses 7 to receive the devices which are employed for fastening the friction element to the shoe. The webs are notched at 7' to receive the recessed parts of the face plate and the engagement of these recessed parts with the notches interlocks these parts. There is an outwardly bent lateral flange 8 on the outer edge of each web 5 between the recesses 7 and there is an inwardly bent lateral flange 9 on the outer edge of each web 5 at each recess 7. The face plate 6 and the flanges 9 have registered openings 10 therein to receive devices for fastening the friction element to the shoe. There are in-turned lateral flanges 11 on the inner edge of each web. The face plate and the webs are formed of sheet metal stampings, the flanges on the webs adding greatly to the strength thereof, and the face plate is secured rigidly to the outer flanges on the webs by spot welding 12 or other suitable means, forming a strong, rigid, substantial and light supporting shoe. The lower ends of the webs are provided with openings 13 to receive a bushing 14 for pivotally mounting the shoe in the brake assembly. The upper ends of the face plate and webs are shaped to form a socket for the shank 15 of the seat 16 for the wear plate 17, Figs. 1, 3. The upper ends of the side plates, Fig. 4, are bent inwardly at 18 and then forwardly in parallel relation to form sides 19 of the socket, flanges 20 being bent inwardly from the sides 19 to form the bottom of the socket. The face plate has a reduced forward extension 21 which overlaps the top edges of the sides 19 and abuts the seat 16 and forms the top plate of the socket for the shank 15 of the seat. The parts of the socket are shaped from the webs and face plate of the shoe seat to receive the shank 15. If the wear plate is mounted loosely in the shoe the shank cannot pull out or fall out of the socket when the shoe is in service because the usual release spring holds the wear plate constantly in contact with the cam; but I prefer to secure the shank in the socket by welding or by other suitable means to retain the wear plate in its seat as a permanent part of the shoe structure in handling and in shipping and at all other times.

The invention embodies a simple construction of stampings rigidly secured together in a simple and efficient manner to provide a strong, rigid and substantial sheet metal supporting shoe suitable for the purposes intended. I have shown the invention in a simple embodiment but I do not limit the invention to the particular form, construction, proportion and arrangement of parts shown in the drawing and described herein but reserve the right to make all such changes as may be necessary or desirable for adapting the invention for other embodiments and for friction brakes of any kind for which the invention is or may be adapted within the scope of the following claims.

I claim:

1. A supporting shoe for a friction element in a brake assembly comprising a pair of sheet metal stampings forming webs and having out-turned lateral flanges at their outer edges, a sheet metal stamping face plate mounted on and secured to said flanges and having spaced recesses, and in-turned lateral flanges on said webs opposite said recesses and secured to said face plate.

2. A supporting shoe for a friction element in a brake assembly comprising a pair of sheet metal stampings forming webs and having out-turned and in-turned lateral flanges at their outer edges, and a sheet metal stamping face plate mounted on and secured to the flanges at the outer edges of the webs and having recesses therein opposite said in-turned flanges, there being registered openings in the recesses in the face plate and the in-turned lateral flanges to receive devices for fastening a friction element on the face plate.

3. A supporting shoe for a friction element in a brake assembly comprising a pair of sheet metal stampings forming webs and a sheet metal stamping face plate mounted on and secured to said webs, the ends of the webs being bent to form the sides and bottom of a socket to receive the shank of a wearing plate seat, and the corresponding end of the face plate being extended to form a top for said socket.

4. A supporting shoe for a friction element in a brake assembly comprising a pair of sheet metal stampings forming webs and a sheet metal stamping face plate mounted on and secured to said webs, end portions of the webs being bent inwardly and forwardly and having lateral flanges thereon to form the sides and bottom of a socket for the shank of a wearing plate seat, and the face plate having an extension forming a top plate for the socket.

5. A supporting shoe for a friction element in a brake assembly comprising a pair of sheet metal stampings forming webs, a sheet metal stamping face plate mounted on said webs, said webs being notched and said face plate being recessed and the recessed portion of the face plate being seated in said notches.

6. A supporting shoe for a friction element in a brake assembly comprising a pair of sheet metal stampings forming webs and having lateral flanges at their outer edges, and a sheet metal stamping face plate mounted on and secured to said flanges, there being spaced transverse recesses in the face plate and openings extending through the recessed portions of the face plate and the flanges.

WILLIAM A. BLUME.